G. BEST.
PIPE COUPLING.
APPLICATION FILED DEC. 11, 1912. RENEWED OCT. 27, 1915.
1,185,049.
Patented May 30, 1916.
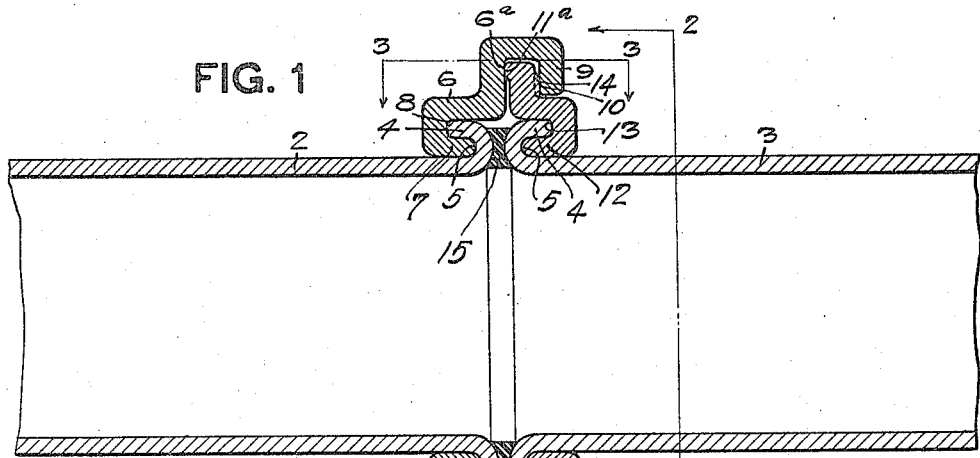
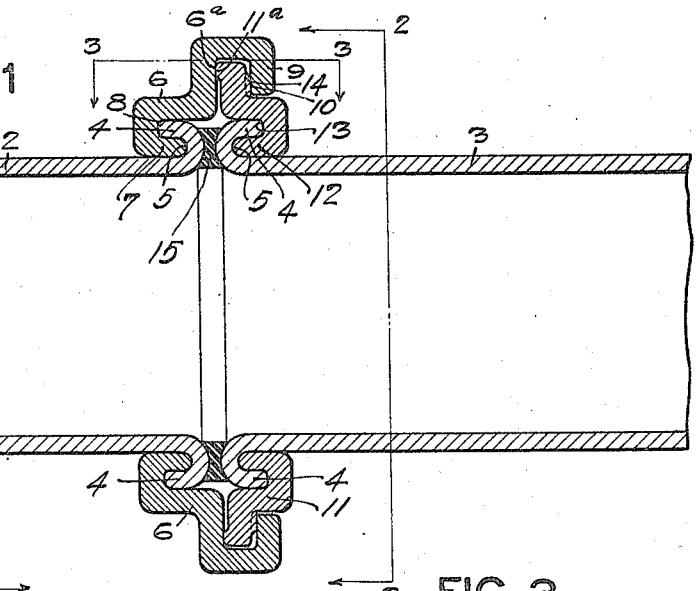
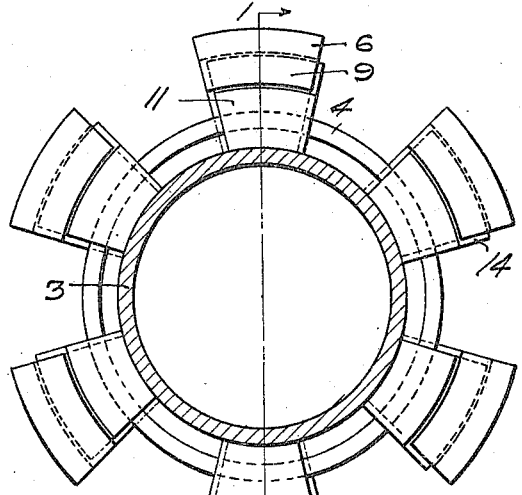
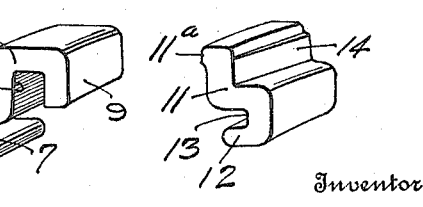

UNITED STATES PATENT OFFICE.

GEORGE BEST, OF OAKMONT, PENNSYLVANIA.

PIPE-COUPLING.

1,185,049.

Specification of Letters Patent.

Patented May 30, 1916.

Application filed December 11, 1912, Serial No. 736,116. Renewed October 27, 1915. Serial No. 58,301.

*To all whom it may concern:*

Be it known that I, GEORGE BEST, a citizen of the United States, and resident of Oakmont, in the county of Allegheny and State of Pennsylvania, have invented a new and useful Improvement in Pipe-Couplings; and I do hereby declare the following to be a full, clear, and exact description thereof.

My invention relates to pipe couplings for use in gas, oil, water, steam, air and other lines.

The object of my invention is to provide a strong and efficient form of pipe coupling in which the pipe sections are securely united together to form a tight and leakage proof joint, the couplings being made without the use of any particular tools and without the use of bolts or nuts. To these ends my invention comprises the novel features hereinafter set forth and claimed.

In the drawing, Figure 1 is a longitudinal section of a portion of pipe section showing my invention applied thereto; Fig. 2 is a section on the line 2—2 Fig. 1 looking in the direction of the arrows; Fig. 3 is a section on the line 3—3 Fig. 1; Figs. 4 and 5 are views of the clips.

In the drawing the numerals 2 and 3 designate the end portions of the pipes to be united by my improved couplings and the ends of said pipes are bent outwardly to form the flange portions 4. The end of the pipe is preferably bent back on a curve so as to form the annular recesses 5. The clamp 6 has the inwardly projecting bottom flange 7 which is adapted to fit within the recesses 5 and said flange forms with the body of the clamp the recess 8 to receive the bent end portion 4 of the pipe. The clamp 6 is further provided with the overlapping portion 9 which has its inner face 10 inclined or tapering, as shown in Fig. 3.

The clamp 11 has the bottom flange 12 which is adapted to engage the seat 5 in the other section of pipe, and the recess 13 to receive the outwardly bent portion 4 of said pipe. The upper end of the clamp 11 has the inclined or tapering rib 14 as shown in Fig. 5, which is adapted to engage the inclined face 10 of the clamp 6. The outer inside face of the clamp 11 has the rib 11$^a$ which is adapted to engage the inner face 6$^a$ of the clamp 6.

In assembling the parts the pipe sections 2 and 3 are adjusted with their ends adjacent to each other, and the gasket 15 of suitable material is interposed between the ends of said pipe. The clamps 6 and 11 are then adjusted into position by bringing their flanges 7 and 12 into engagement with the seats 5 of the pipe sections and said clamps are then moved circumferentially to bring the overlapping portion 9 of one member with its inclined face 10 into engagement with the inclined face 14 of the other member, as shown in Fig. 2. Any suitable number of clamps may be employed which will permit of their being adjusted in this manner and when the full number of clamps have been positioned as described they are finally fixed or set by a hammer or other instrument which drives the clamping members into locking position by forcing the inclined faces of the clamping members over each other. This action will tend to draw the ends of the pipes toward each other, and the gasket 15 interposed between the ends of said pipe sections will be compressed and a tight joint obtained.

By having the rib 14 located below the extreme upper end of the clamp 11 and engaging the extreme lower end of the downwardly extending overlapping portion 9, while the rib 11$^a$ engages the inner face of the clamp 6 above the point where the rib 14 engages the overlapping portion 9, the inwardly projecting flanges 7 and 12 are forced into the annular recesses 5 and the ends of the pipe drawn together to compress the gasket and give a tight joint. This effect is further increased by having the midline of the gasket to one side of the point where the rib 11$^a$ engages the inner face of the clamp 6.

By the use of a number of independent clamping members, the engagement of each pair of clamping members, with which there is always insured an even pressure on the gasket, is obtained so that the joint is just as tight at one point as another. Furthermore in case one pair of clamps is not doing the proper work or needs replacing, this can be readily accomplished without removing any of the other clamps.

The coupling can be made out in the field without the use of any particular form of tool, and no bolts or nuts are required. The only instrument required is a hammer or something to bring the members into locking position after they have been adjusted in place.

What I claim is:

In a pipe coupling, the combination of the pipe sections with outwardly turned ends, of a series of independent clamping members engaging said ends, one of said clamping members overlapping the other, the overlapped member having an inclined rib engaging the inner face of the outer end of the overlapping portion of the other member, and a second rib on said overlapped member engaging the inner face of said overlapping member beyond opposite the point where said inclined rib engages said overlapping member.

In testimony whereof, I the said GEORGE BEST have hereunto set my hand.

GEORGE BEST.

Witnesses:
 ROBERT C. TOTTEN,
 JOHN F. WILL.